(12) United States Patent
Chiew et al.

(10) Patent No.: US 8,976,042 B1
(45) Date of Patent: Mar. 10, 2015

(54) IMAGE COMBINING SYSTEM, DEVICE, AND METHOD OF MULTIPLE VISION SOURCES

(71) Applicants: Daniel Y. Chiew, Marion, IA (US);
Roger L. Yum, Marion, IA (US); Travis S. Vanderkamp, Marion, IA (US);
Alexander D. Reid, Tualatin, OR (US);
Carlo L. Tiana, Portland, OR (US);
Weston J. Lahr, Sherwood, OR (US)

(72) Inventors: Daniel Y. Chiew, Marion, IA (US);
Roger L. Yum, Marion, IA (US); Travis S. Vanderkamp, Marion, IA (US);
Alexander D. Reid, Tualatin, OR (US);
Carlo L. Tiana, Portland, OR (US);
Weston J. Lahr, Sherwood, OR (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 362 days.

(21) Appl. No.: 13/625,268

(22) Filed: Sep. 24, 2012

(51) Int. Cl.
*G08B 21/00* (2006.01)
*G01C 21/00* (2006.01)
*G06F 7/70* (2006.01)

(52) U.S. Cl.
USPC .............................. 340/945; 340/971; 701/14

(58) Field of Classification Search
CPC ...... G01C 23/00; G01C 23/005; G01C 21/00; G03B 7/091; H04N 5/2352; G08G 5/0021; G08G 5/065; G08G 5/0091; G08G 5/025
USPC ........ 340/945, 971–975; 701/10, 14, 16, 120, 701/301, 436
See application file for complete search history.

(56) References Cited

U.S. PATENT DOCUMENTS 7,605,719 B1  10/2009  Wenger et al.

*Primary Examiner* — Brian Zimmerman
*Assistant Examiner* — Thomas McCormack
(74) *Attorney, Agent, or Firm* — Angel N. Gerdzhikov; Donna P. Suchy; Daniel M. Barbieri

(57) ABSTRACT

Present novel and non-trivial system, device, and method for combining image data received from two or more vision systems are disclosed. A system may be comprised of a first vision source, a second vision source, and an image generator ("IG"). The first vision source may be could configured to generate a first image data set and a depth buffer data set, and the second vision data source could configured to generate a second image data set. The IG could be configured to receive both the first and second image data sets; the depth buffer data set; and generate a third image data set as a function of both image data sets, the depth buffer data set, and a pixel cutoff distance that may be fixed or variable. In addition, the pixel cutoff distance may be determined as a function of input variable data.

21 Claims, 7 Drawing Sheets

IMAGE COMBINING SYSTEM, DEVICE, AND METHOD OF MULTIPLE VISION SOURCES

BACKGROUND OF THE INVENTION

1. Field of the Invention

This invention pertains generally to the field of display systems such as, but not limited to, aircraft display systems.

2. Description of the Related Art

Two vision systems employed commonly in the aviation industry are the synthetic vision system ("SVS") and the enhanced vision system ("EVS"). The SVS typically employs a terrain database to create a three-dimensional perspective of the scene in front of the aircraft on a two-dimensional display unit, whereas the EVS typically employs image sensor(s) to acquire real-world image data representative of an image that may be presented on the screen of one or more display units. Each vision system has its advantages and its disadvantages. One of the advantages of the SVS is that the image is not affected by meteorological conditions; however, one of its disadvantages is its inability to display actual objects location in the scene in front of the aircraft.

There are systems which simultaneously combine SVS image data with EVS image data. One such system has been disclosed by Wenger et al in U.S. Pat. No. 7,605,719 entitled "System and Methods for Displaying a Partial Images and Non-Overlapping, Shared-Screen Partial Images Acquired from Vision Systems," wherein a visual spectrum camera system may be used to determine where the EVS image data will be employed and the SVS image data will be employed in a combined image data.

When an SVS generates synthetic image data, it may generate two arrays: a synthetic pixel image array and a depth array populated with multiple values, where each value may be a measurement of depth (i.e., slant range) between the aircraft and each point on the surface represented by a corresponding pixel within the synthetic pixel image array. Because there may be times at which an image generated by the EVS may be disadvantageous (e.g., poor meteorological conditions), a pixel cutoff distance could be defined and used in conjunction with the depth array to determine whether a pixel should be defined with SVS image data or EVS image data.

BRIEF SUMMARY OF THE INVENTION

The embodiments disclosed herein present novel and non-trivial system, device, and method for combining image data generated by a plurality of vision systems of an aircraft. With the embodiments disclosed herein, an image generated by an SVS may be substituted for an image generated by an EVS as a function of a pixel cutoff distance and the values populated in an SVS-created depth array.

In one embodiment, a system for combining image data is disclosed. The system may be comprised of a first vision source, a second vision source, and an image generator ("IG"), where the first vision source may be configured to generate a first image data set representative of a first scene outside an aircraft and a depth buffer data set representative of a plurality of depth distances. The first vision source could be comprised of an SVS, and the second vision source could be comprised of an EVS. The system could also be comprised of one or more sources of input variable data and a presentation system.

In another embodiment, a device for combining image data is disclosed. The device may be comprised of the IG configured to perform the method disclosed in the following paragraph.

In another embodiment, a method for combining image data is disclosed. The method may be comprised of receiving a first image data set; receiving a depth buffer data set; receiving a second image data set; generating a third image data set as a function of the first image data set, the depth buffer data set; the second image data set, and data representative of a pixel cutoff distance; and providing the third image data set to one or more user systems. As embodied herein, at least one depth distance of the depth buffer data set could be determined as a function of the pixel cutoff distance and a surface feature. In addition, the generating of the third image data set could be comprised of identifying each location within the depth buffer data set at which the depth distance is less than or equal to the pixel cutoff distance, and replacing pixel data of the first image data set with pixel data of the second image data set at each location corresponding to each identified location within the depth buffer data set. The function for generating the third image data set could include data representative of fields of vision and one or more input variables. The pixel cutoff distance could be determined as a function of each input variable received from its respective source.

BRIEF DESCRIPTION OF THE DRAWINGS

The drawings of FIG. 1 depict a functional block diagram of a system for combining image data.

DETAILED DESCRIPTION OF THE INVENTION

In the following description, several specific details are presented to provide a thorough understanding of embodiments of the invention. One skilled in the relevant art will recognize, however, that the invention can be practiced without one or more of the specific details, or in combination with other components, etc. In other instances, well-known implementations or operations are not shown or described in detail to avoid obscuring aspects of various embodiments of the invention.

Figure 1:
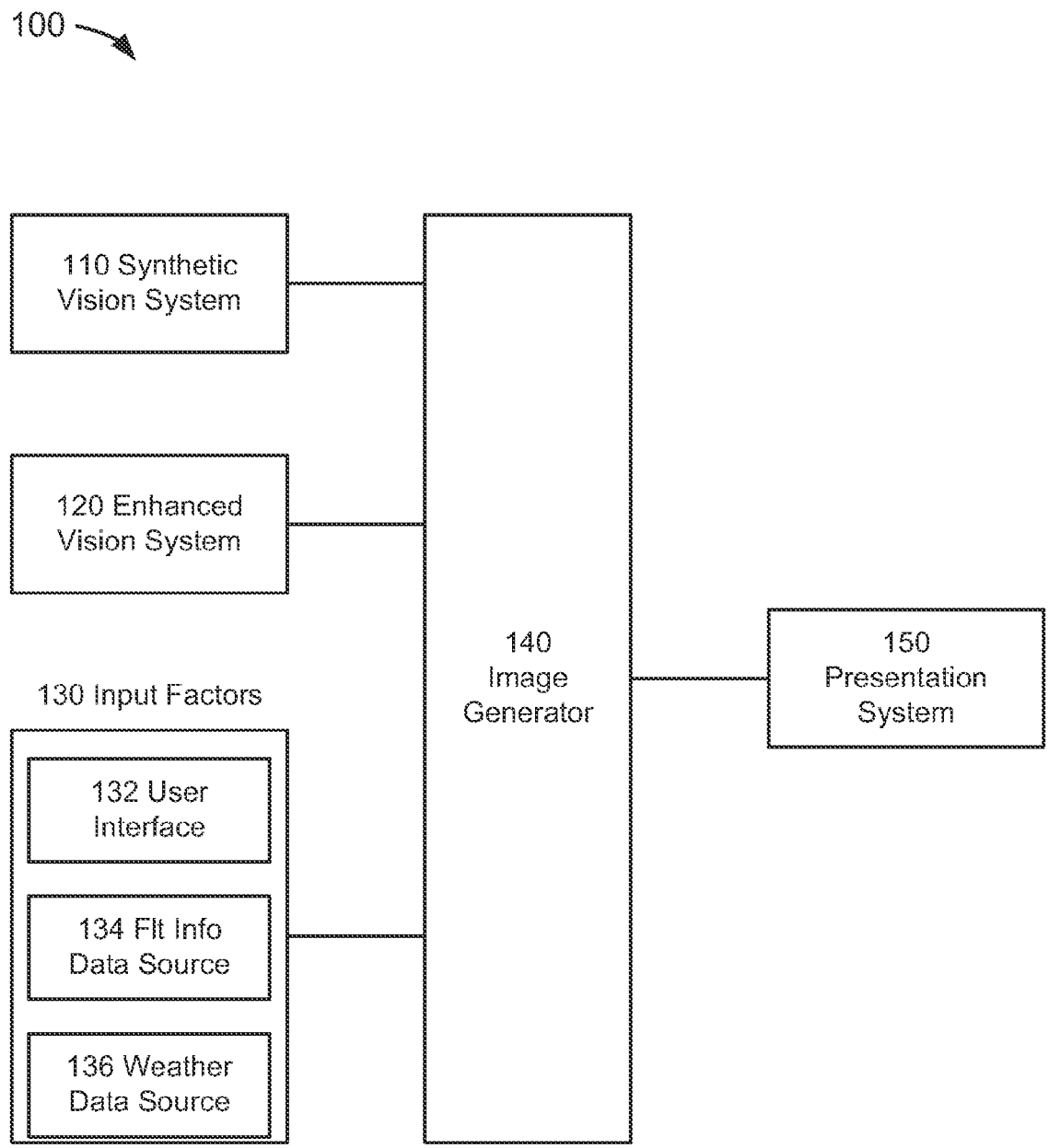

FIG. 1 depicts a functional block diagram of a combined vision system 100 suitable for implementation of the techniques described herein. The functional blocks of the system may include a synthetic vision system ("SVS") 110, an enhanced vision system ("EVS") 120, an input variable system(s) 130, an image generator ("IG") 140, and a presentation system 150.

In an embodiment of FIG. 1, the SVS 110 could be comprised of any system which generates data representative of the synthetic image, where such image may be presented on one or more display units of the presentation system 150. The SVS 110 may be comprised of a source of terrain data (e.g., a terrain database) and/or a separate data processing system. The SVS 110 could employ the terrain data source to create a three-dimensional perspective of a scene outside aircraft on a two-dimensional display unit of the presentation system 150. The SVS 110 could employ topographical colors similar to those depicted on standard aeronautical charts. The three-dimensional perspective and topographical coloring could present an alternative view to the "blue/brown" electronic attitude indicator used in classic electronic primary flight displays, the perspective and coloring scheme that is known to those skilled in the art. The SVS 110 may allow the pilot to "see" the terrain ahead in two dimensions even though his visibility of the actual scene may be limited or obscured by meteorological conditions such as clouds and fog. The SVS 110 is a system known to those skilled in the art. As embodied herein, the SVS 110 could provide an image data set to the IG 140 for subsequent processing as discussed herein.

In an embodiment of FIG. 1, the EVS 120 could be comprised of any system that generates data representative of an enhanced image, where such image may be comprised of a real-world image presented on one or more display units of the presentation system 150. At least one infrared camera may be mounted on the aircraft for detecting infrared radiation emanating from the scene outside the aircraft; alternatively, at least one sensor may be mounted on the aircraft to detect non-visible, near-infrared radiation such as that emitted from many runway and landing lights the scene. The EVS 120 may employ a sensor operating in any spectral band even outside of infrared or visible bands. The EVS 120 may also employ a display-generating processor operatively coupled to the sensors configured to generate a representation of the scene outside the aircraft on one or more display units of the presentation system 150.

The EVS 120 may be comprised of an infrared camera or other spectrally sensitive device and/or a separate data processing system. The infrared camera may be considered a forward-looking image capture device. Although discussed herein singularly, the infrared camera could be comprised of a plurality of cameras. Additionally, the infrared camera could mean one or more sensors for detecting non-visible, near infrared radiation such as that radiation emitted by many runway and landing lights, or otherwise detect the position of runway lights, for example through sensing of reflections of radio-frequency pulses such as from a radar. The infrared camera could receive enhanced image data representative of the scene outside aircraft that might be obscured from the pilot's view. The EVS 120 is a system known to those skilled in the art. As embodied herein, the EVS 120 could provide an image data set to the IG 140 for subsequent processing as discussed herein.

In an embodiment of FIG. 1, the input variable system(s) 130 could be comprised of any system that could provide data used to define a pixel cutoff distance as discussed in detail below. The input variable system(s) 130 could be, but not limited to, one or more of the following: a user interface 132, a flight information data source 134, and a datalink 136.

In an embodiment of FIG. 1, the user interface 132 could be comprised of a system and/or any panel, module, component, unit, and/or sub-system thereof which facilitates a pilot's ability to manually enter data and/or make selections. The user interface 132 may allow a pilot to manually enter such data as, but not limited to, weather information. Also, the user interface 132 may allow a pilot to adjust and/or select a pixel cutoff distance. In one embodiment, the user interface 132 could be comprised of a cursor-pointing device such as, but not limited to, a mouse and/or trackball enabling the pilot to interact with a visual display unit configured with a graphical user interface ("GUI"). In another embodiment, the user interface 132 could be comprised of a display unit configured with a touch screen enabling the pilot to interact with a GUI.

In another embodiment, the user interface 132 could be comprised of one or more tactile buttons and/or keys of a keyboard. In another embodiment, the user interface 132 could be comprised of a speech recognition system configured to receive pilot input manually. As embodied herein, the user interface 132 could provide input data to the IG 140 for subsequent processing as discussed herein.

In an embodiment of FIG. 1, the flight information data source 134 could be any source(s) from which flight information may be stored and provided to or retrieved by the IG 140. One flight information data source 134 is commonly known as a flight management system ("FMS"). The FMS may perform a variety of functions performed to help the crew in the management of the flight, and such functions are known to those skilled in the art. In the performance of its many functions, the FMS may receive navigation data from one or more navigation systems containing information regarding the current state of the aircraft. The navigation system could be comprised of, but is not limited to, an air/data system, an attitude heading reference system, an inertial guidance system (or inertial reference system), a global navigation satellite system ("GNSS") or satellite navigation system such as the global positioning system ("GPS"), and a radio altimeter system, all of which are known to those skilled in the art. As embodied herein, the navigation system could provide navigation information including, but not limited to, geographic position, altitude, attitude, speed, vertical speed, heading, radio altitude, and data quality. As embodied herein, aircraft position could be comprised of geographic position (e.g., latitude and longitude coordinates) and altitude, and direction may be derived from either geographic position, aircraft position, or both. As embodied herein, aircraft orientation could be comprised of pitch, roll, and/or yaw information related to the attitude of the aircraft.

It should be noted that, as embodied herein for any source or system in an aircraft including the FMS and/or navigation system, data could be comprised of any analog or digital signal, either discrete or continuous, which could contain information. As embodied herein, aircraft could mean any vehicle which is able to fly through the air or atmosphere including, but not limited to, lighter than air vehicles and heavier than air vehicles, wherein the latter may include fixed-wing and rotary-wing vehicles.

Functions performed by the FMS could include the receiving of flight plan information and constructing lateral and vertical flight plan components. A pilot could create a flight plan from waypoints stored in a database or select a flight plan stored in a navigation database of the FMS. Also, a flight plan may be modified at any time. A flight plan could be used to guide an aircraft from one position to the next and to compute many flight parameters including, but not limited to, estimated time enroute, estimated time of arrival to a destination airport and/or alternate airport, and estimated fuel consumption between waypoints.

Typically, an FMS is comprised of a navigation database that stores data associated with a flight plan such as, but not limited to, published IAPs, ground-based navigational aids, waypoints, holding patterns, airways, airports, heliports, instrument departure procedures, instrument arrival procedures, runways, precision approach aids, company routes, airport communications, localizer and airway markers, special use airspace, airport sector altitudes, enroute airways restrictions, enroute communications, preferred routes, controlled airspace, geographical references, arrival and/or departure flight planning, path point records, and GNSS Landing Systems. The navigation database employed by the FMS could be a database described in the following document published by Aeronautical Radio, Incorporated ("ARINC"): ARINC Specification 424 entitled "Navigations Systems Data Base" ("ARINC 424"), an aviation industry standard known to those skilled in the art.

In a lateral flight plan, the FMS could perform many functions including, but not limited to, navigational computations, radio navigation aids selections, and providing lateral flight information which could maintain the aircraft along the flight plan from takeoff to approach. In a vertical flight plan, the FMS could compute an optimum speed at each point and aircraft weight and center of gravity. Then, it could compute predictions along the flight plan based on these speeds and weight. It could also provide vertical flight information in reference to such predictions. Other miscellaneous performance computations are also made. Computations and underlying algorithms performed by an FMS are known to those skilled in the art.

A pilot or flight crew may initialize an FMS including, but not limited to, the selection of a flight plan, where such flight plan could provide the basis for all computations and displays. A flight plan may be composed of various lateral and vertical elements that may be defined during initialization, and it may be defined using navigation data stored in the navigation database.

Lateral elements of a flight plan could include origin airport and runway; a departure procedure that may include, but is not limited to, a standard instrument departure; an enroute transition; enroute airways and waypoints; an arrival procedure that may include, but is not limited to, an enroute transition, a standard terminal arrival route procedure ("STAR"), a STAR-approach transition, an approach procedure, a missed approach procedure, and a holding procedure; and a flight plan to an alternate airport. Such procedures may be defined by various legs and waypoints between legs.

Vertical elements could include a takeoff altitude which may include, but is not limited to, a thrust reduction and/or acceleration altitudes; altitude constraints at one or more waypoints located along the flight path; vertical speed and/or flight path angle constraints at one or more waypoints located along the flight plan; speed constraints at one or more waypoints along the flight plan; climb and descent speed limits; climb and descent step legs; and cruise flight levels. As embodied herein, the flight information data source 134 could provide input data to the IG 140 for subsequent processing as discussed herein.

In an embodiment of FIG. 1, the weather data source 136 could be comprised of any source of weather data including, but not limited to, a datalink system and/or the user interface 132. The datalink system could be comprised of those system(s) configured to receive data from source(s) external to the aircraft including, but not limited to, ground stations and satellites. Data representative of weather information could be transmitted to the pilot or flight crew of an aircraft via the datalink system which could provide weather information data representative of ceiling and visibility information of the destination and/or alternate airports. Weather data transmitted through a datalink system could originate from or be provided by a plurality of weather data sources including, but not limited to, XM Satellite Radio, Inc. and Universal Weather and Aviation, Inc. Weather data that may be broadcast could include data contained in a variety of weather products such as, but not limited to, Aviation Routine Weather Report ("METAR"), Significant Meteorological Information ("SIGMET"), Airmen's Meteorological Information ("AIRMET"), Next-Generation Radar ("NEXRAD"), surface analysis weather maps, surface pressure, surface wind speed and direction, winds aloft, wind shear detection, echo tops, and freezing levels. As embodied herein, the weather data source 136 could provide input data to the IG 140 for subsequent processing as discussed herein.

As embodied herein, the input variable system(s) 130 could include the SVS 110 and/or the EVS 120. For the purpose of illustration and not of limitation, the resolution of the terrain data used in generating the synthetic image by the SVS 110 could be employed by the IG 140 to adjust a pixel cutoff distance. Similarly, the EVS 120 could employ sensor(s) configured to compute, calculate, and/or estimate visibility, where the precision and/or reliability of such sensors could be used by the IG 140 to adjust a pixel cutoff distance. The cutoff may be a hard cutoff or a smooth fade between image sources.

In an embodiment of FIG. 1, the IG 140 may be any electronic data processing unit which executes software or computer instruction code that could be stored, permanently or temporarily, in a digital memory storage device or computer-readable media (not depicted herein) including, but not limited to, RAM, ROM, CD, DVD, hard disk drive, diskette, solid-state memory, PCMCIA or PC Card, secure digital cards, and compact flash cards. The IG 140 may be driven by the execution of software or computer instruction code containing algorithms developed for the specific functions embodied herein. The IG 140 may be an application-specific integrated circuit (ASIC) customized for the embodiments disclosed herein. Common examples of electronic data processing units are microprocessors, Digital Signal Processors (DSPs), Programmable Logic Devices (PLDs), Programmable Gate Arrays (PGAs), and signal generators; however, for the embodiments herein, the term "IG" is not limited to such processing units and its meaning is not intended to be construed narrowly. For instance, the IG 140 could also consist of more than one electronic data processing unit. As embodied herein, the IG 140 could be a processor(s) used by or in conjunction with any other system of the aircraft including, but not limited to, the SVS 110, the EVS 120, the input variable system(s) 130, and the presentation system 150, or any combination thereof.

The IG 140 may be programmed or configured to receive as input data representative of information obtained from various systems and/or sources including, but not limited to, the SVS 110, the EVS 120, and the input variable system(s) 130. As embodied herein, the terms "programmed" and "configured" are synonymous. The IG 140 may be electronically coupled to systems and/or sources to facilitate the receipt of input data. As embodied herein, operatively coupled may be considered as interchangeable with electronically coupled. It is not necessary that a direct connection be made; instead, such receipt of input data and the providing of output data could be provided through a data bus or through a wireless network. The IG 140 may be programmed or configured to execute one or both of the methods discussed in detail below. The IG 140 may be programmed or configured to provide output data to various systems and/or units including, but not limited to, the presentation system 150.

In an embodiment of FIG. 1, the presentation system 150 could be comprised of a display unit such as a Head-Down Display ("HDD"), Head-Up Display ("HUD"), and/or a portable electronic device such as, but not limited to, a notebook computer and/or tablet. Each display unit may be configured to present the pilot with an SVS image, an EVS image, and/or a combined SVS-EVS image represented in an image data set generated by the IG 140.

In addition, each display unit may be configured to generate symbology that is presented thereon. For example, symbology representative of a flight director visual cue, a flight path vector, and other aircraft traffic provided by an aircraft collision avoidance system may be presented on the screen of the display unit. As embodied herein, the presentation system 150 could be configured to receive an image data set generated by the IG 140.

Figure 2:
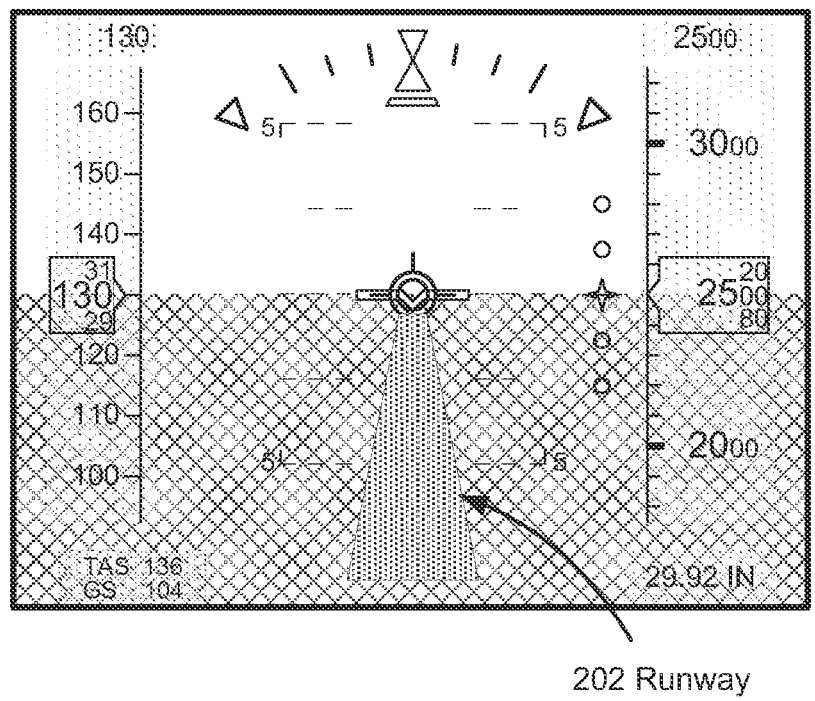
FIG. 2 depicts an exemplar depiction of a head-down display ("HDD") and symbology presented thereon.

Referring to FIG. 2, an exemplar depiction of an HDD configured to display tactical information to the pilot against the background of a synthetic image is illustrated, where the synthetic image of FIG. 2 is comprised of a runway 202 (indicated by the dot fill) and surrounding terrain (indicated by the cross-hatching fill). It should be noted that, for the sake of illustration and not of limitation, the discussion that follows will be drawn to terrain that is even and comprised of the same elevation throughout the entire scene; the disclosures stated herein also apply to a scene in which the terrain is uneven.

It should be noted that the tactical information depicted on the HDD of FIG. 2 is minimal for the sake of presentation herein and not indicative of the plurality of indications or information (i.e., symbology) with which it may be configured. Because the indications or information shown on the HDD of FIG. 2 are well-known to those skilled in the art, a discussion of the specific tactical information is not necessary. It should be further noted that, for the sake of presentation, the tactical information depicted on the HDD shown in FIG. 2 has been intentionally omitted from the exemplary displays of FIGS. 3A through 4F not indicative of the plurality of indications with which it may be configured; the omission of tactical information does not narrow the embodiments herein or create a limitation of them. Moreover, although the remaining discussion will be drawn to the HDD, the embodiments disclosed herein may be applied to other display units such as, but not limited to, the HUD and/or the portable electronic device.

Figure 3A:
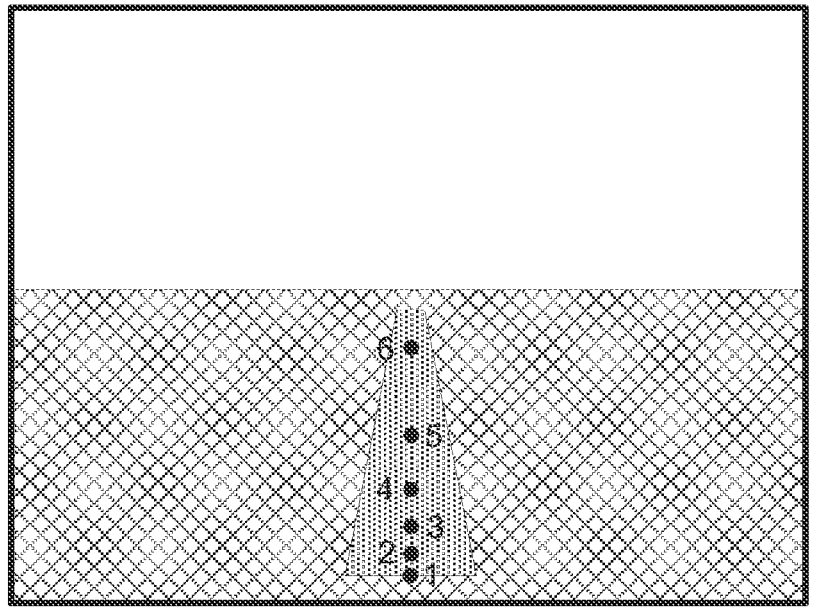
FIG. 3A depicts the HDD unit of FIG. 2 without the symbology.
Figure 3B:
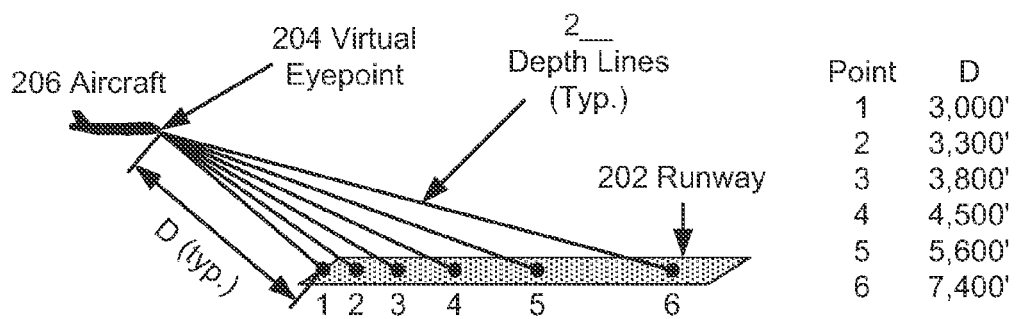
FIGS. 3B and 3C depict various depth measurements of six points.

Referring to FIG. 3A, the synthetic image of FIG. 2 comprised of the runway and the terrain is shown without the tactical information being presented; however, there are six points 1 through 6 representative of six locations on the runway that correspond to one pixel. Referring to FIG. 3B, there is one depth D provided for each of the six points on the runway 202, where each depth D is representative of a distance between a virtual eyepoint 204 of aircraft 206 and a respective point; an assumed value of depth D for each point is provided in tabular form (D1 is 3,000 feet, D2 is 3,300 feet, D2 is 3,800 feet etc. . . . ). Each depth D may be determined as a function of aircraft position and the elevation at the respective point, where the aircraft position and surface elevation (which may include the elevation of one or more surface features such as runway) could be provided by the FMS and a terrain data source, respectively. During the generation of the synthetic image data set, those skilled in the art understand that a depth array may be created simultaneously with a synthetic pixel image array representative of the scene outside the aircraft. The contents of the depth array may be populated with multiple values, where each value may be a value of depth D for each point on the surface represented by a corresponding pixel within the synthetic pixel image array. As embodied herein, each value of depth D calculated by the SVS 110 may not be less than a minimum depth distance and may not be greater than a maximum depth distance.

Figure 3C:
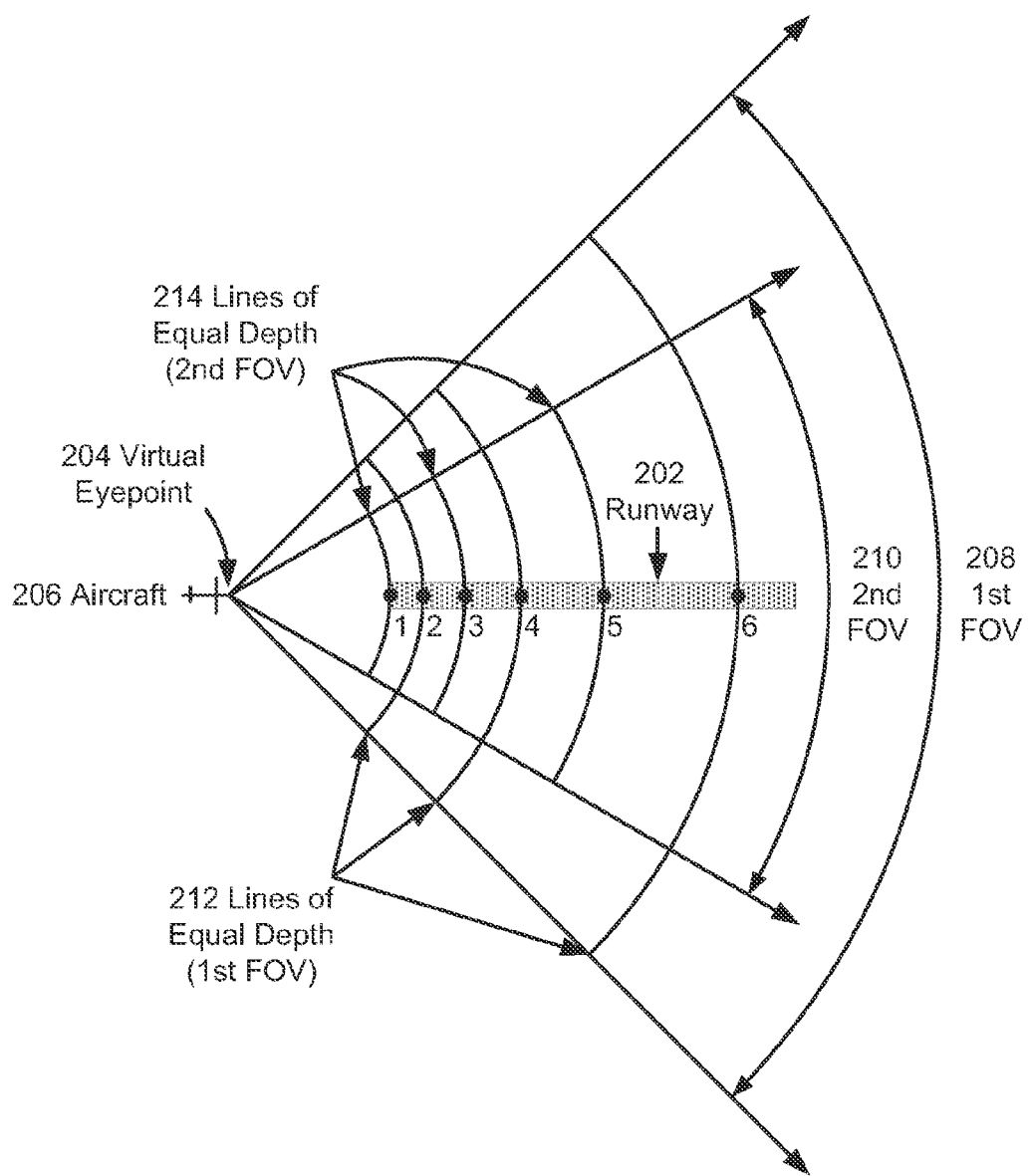

Referring to FIG. 3C, two fields of views (singularly, "FOV") are shown in a plan view. Each FOV could correspond to the FOV of one vision system; for example, the first FOV 208 could correspond to the SVS 110 and the second FOV 210 could correspond to the EVS 120. Also, there are three lines of equal depth 212 corresponding to the first FOV 208, and three lines of equal depth 214 corresponding to the second FOV 210. Because the terrain has been assumed in FIG. 3C to be even and comprised of the same elevation throughout the entire scene, these lines are comprised of circular arcs.

As observed in FIG. 3C, the lines of equal depth 212 pass through points 2, 4, and 6. This means that line passing through point 2 is representative of multiple points on the surface in the scene having the depth D of 3,300 feet; likewise, the lines passing through points 4 and 6 are representative of multiple points having the respective depths D of 4,500 feet and 7,400 feet. Similarly, the lines of equal depth 214 passing through points 1, 3, and 5 are representative of multiple points having the respective depths D of 3,000 feet; 3,800 feet; and 5,600 feet. Regarding the depth array created simultaneously with a synthetic pixel image array, it may also be populated with the value of depth D for each point on the lines of equal depth 212 and 214 represented by a corresponding pixel within the synthetic pixel image array.

Figure 4A:
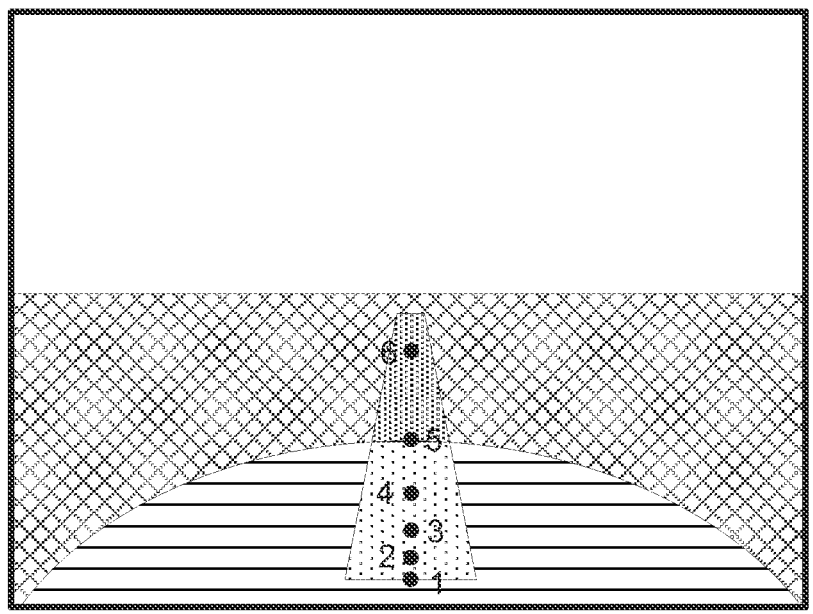
FIGS. 4A through 4F depict six images represented by combined image data.

The advantages and benefits of the embodiments discussed herein may be illustrated by showing examples of how a depth array may be employed to form combined image data comprised of a combination of both the SVS and EVS image data and representative of the scene outside the aircraft. Referring to FIG. 4A, a combined image comprised of an SVS image and an EVS image is shown. The runway and surrounding terrain of the SVS image are indicated by the greater-density dot fill and cross-hatching fill, respectively; likewise, the runway and surrounding terrain of the EVS image are indicated by the lesser-density dot fill and horizontal-hatching fill, respectively.

As observed in FIG. 4A, a line of equal depth passing through point 5 and corresponding to 5,600 feet separates the SVS image from the EVS image. To generate an image data set representative of the combined image, the IG 140 may be programmed to replace the contents of the synthetic pixel image array with the corresponding contents of the enhanced pixel image array using the depth buffer and a pixel cutoff factor comprised of a pixel cutoff distance.

With a pixel cutoff distance of 5,600 feet, the IG 140 may identify each location within the depth array having the value of depth D lesser than, greater than, or equal to 5,600. For those depth array locations having values lesser than or equal to 5,600 feet, the synthetic pixel data located within the synthetic pixel image array at the locations corresponding to the identified depth array locations may be replaced with enhanced pixel data located within the enhanced pixel image array corresponding to the same locations. The resultant combination of synthetic pixel data and enhanced pixel data may form a combined image data set representative of the scene outside the aircraft that, when provided to the presentation system 150, may be presented on the display unit as illustrated in FIG. 4A.

Figure 4B:
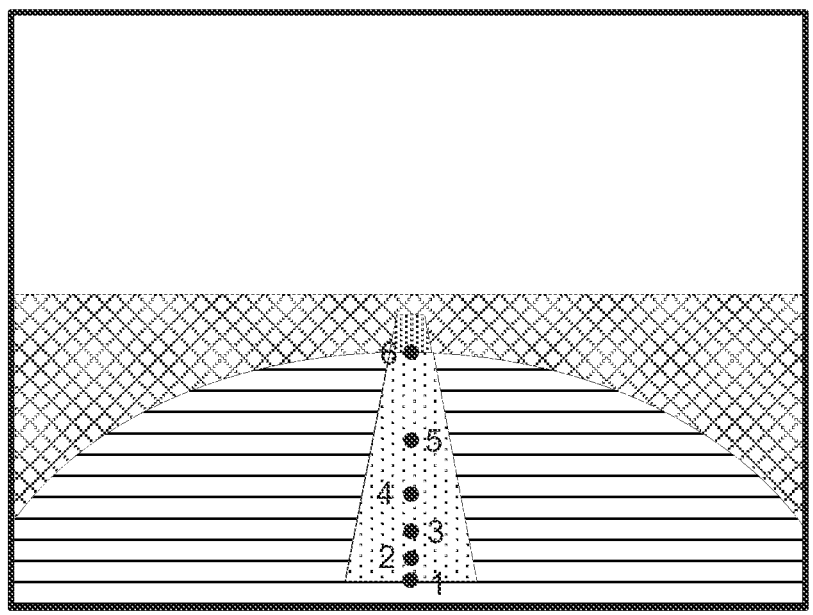
Figure 4C:
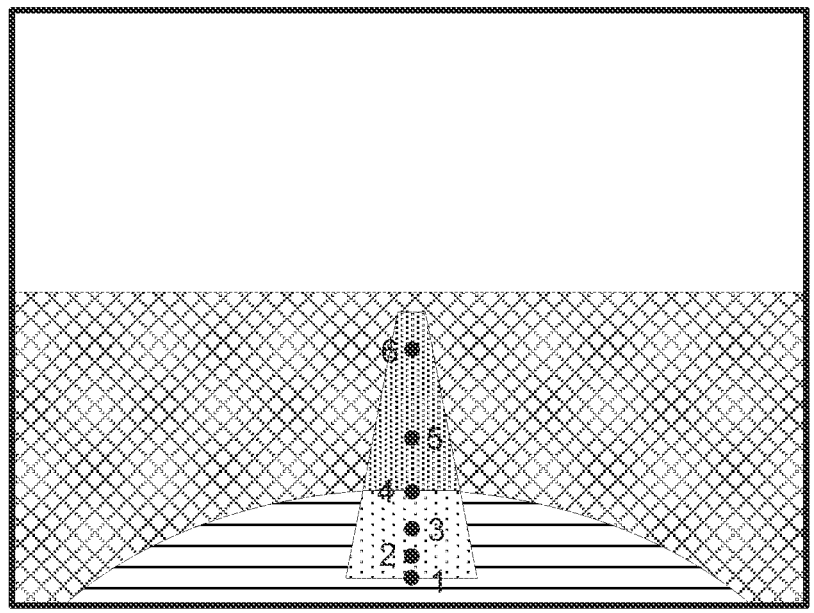

The pixel cutoff distance may be fixed or variable, where the variableness may depend on one or more inputs from the input variable system(s) 130. For example, a pilot could select a pixel cutoff distance. As shown in FIGS. 4B and 4C, the pilot has selected a pixel cutoff distances of 7,400 feet and 4,500 feet, respectively.

It should be noted that, although the discussions herein are drawn to the replacement of synthetic pixel data with enhanced pixel data to form a combined image data set, the embodiments herein could apply to the replacement of enhanced pixel data with synthetic pixel data for depth array locations having values greater than or equal to the pixel cutoff distance to form a combined image data set. It should be further noted that a smoothing algorithm known to those skilled in the art may be applied to any border that may separate enhanced pixel data and synthetic pixel data, rendering a result that is more pleasingly viewable.

Besides the manual selection of the pixel cutoff distance, this may be determined automatically. For the purpose of illustration and not limitation, the following examples are provided. In one example, the pixel cutoff distance may be determined using data representative of weather visibility at an airport received through the user interface 132 and/or the datalink 136. In another example, the pixel cutoff distance may be determined using data representative of the navigation information discussed above received through the flight information data source 134. In another example, the pixel cutoff distance may be determined using data representative of instrument approach procedure information may be received through the flight information data source 134. In another example, the pixel cutoff distance may be determined using data representative of aircraft performance factors (i.e., those factors such as, for example, weight and density altitude that effect aircraft performance).

The pixel cutoff distance may be used to form a combined image data set comprised of synthetic pixel data only or enhanced pixel data only. Setting the pixel cutoff distance to a very low value (i.e., a value lower than a minimum value of depth D) could result with synthetic image data only; this illustration shown in FIG. 3A could have been formed by setting the pixel cutoff distance to a very lower value. Similarly, setting the pixel cutoff distance to a very high value (a value greater than a maximum value of depth D) could result with enhanced image data only.

Figure 4D:
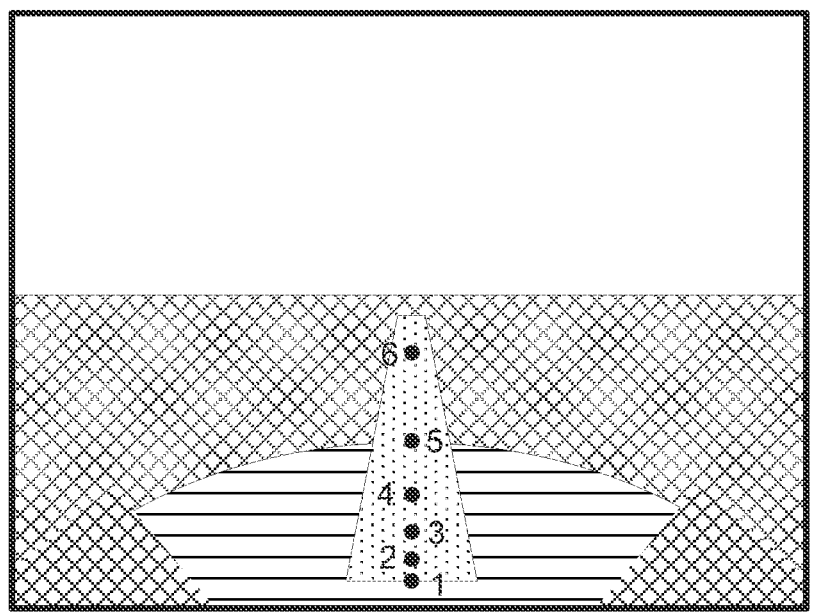

In the event that the FOV for the SVS 110 differs with the FOV of the EVS 120, it may not be possible to replace enhanced image data. Referring to FIG. 4D, the IG 140 may identify each location within the depth array having the value of depth D lesser than, greater than, or equal to 5,600. For those depth array locations having values lesser than or equal to 5,600 feet, the synthetic pixel data located within the synthetic pixel image array at the locations corresponding to the identified depth array locations may be replaced with enhanced pixel data located within the enhanced pixel image array corresponding to the same locations; however, the synthetic pixel data may not be replaced if the enhanced pixel image array does not have corresponding locations due to a smaller FOV of the EVS 120. The resultant combination of synthetic pixel data and enhanced pixel data may form a combined image data set representative of the scene outside the aircraft that, when provided to the presentation system 150, may be presented on the display unit as illustrated in FIG. 4D.

Figure 4E:
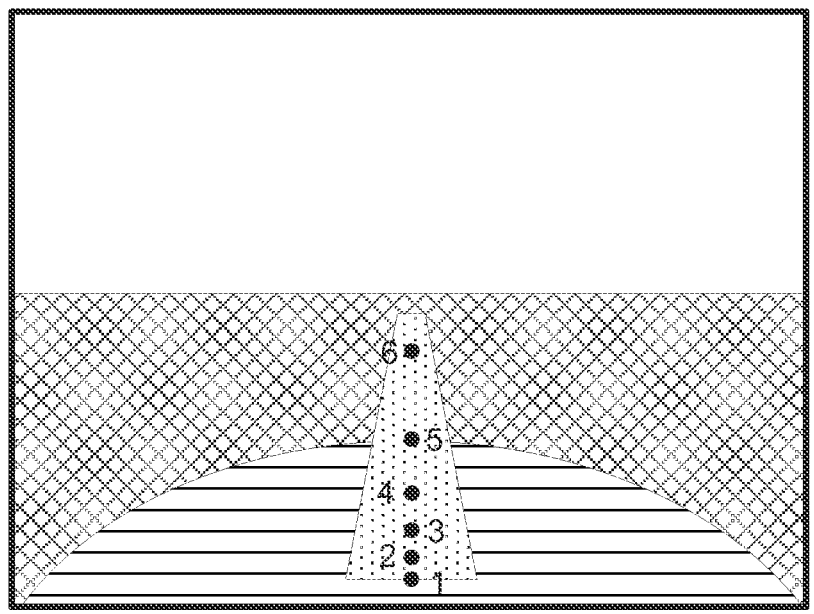

In addition to the IG 140 identifying each location within the depth array having the value of depth D lesser than, greater than, or equal to the pixel cutoff distance, the SVS 110 could be configured to modify the depth array with the pixel cutoff distance during the generation of the synthetic pixel image array. For example, when synthetic pixel data representative of a point on a surface feature (e.g., a runway) is being generated by the SVS 110, the value of the actual depth D to the point contained in the depth array could be replaced by the pixel cutoff distance. For example, assume the pixel cutoff distance is 5,600 feet. When the IG 140 identifies each location within the depth array having the value of 5,600 feet, each point of the surface feature will be identified. The resultant combination of synthetic pixel data and enhanced pixel data formed into a combined image data set representative of the scene outside the aircraft is shown in FIG. 4E.

Figure 4F:
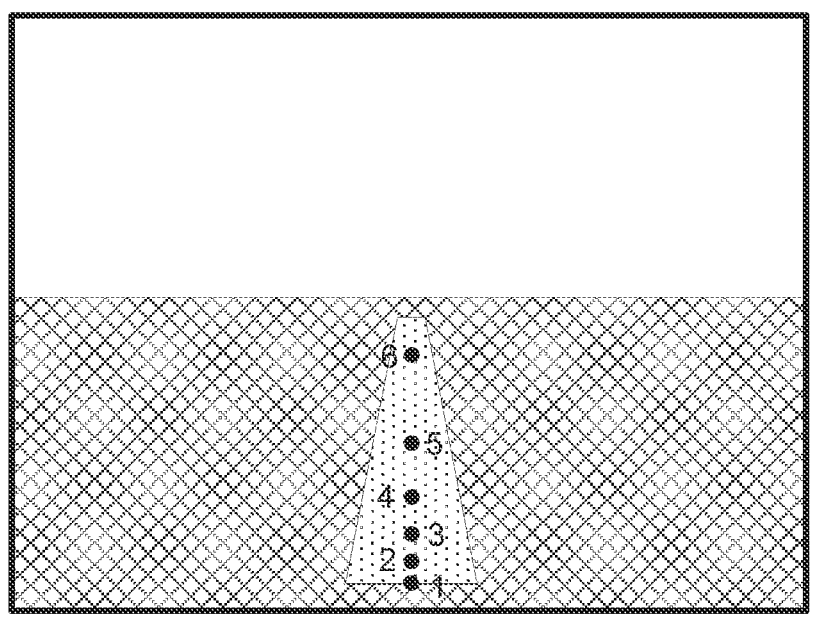

As shown in FIG. 4F, the combined image data set includes enhanced pixel data representative of the entire runway only and synthetic pixel data representative of the surrounding terrain only. To generate this combined image data set, the SVS 110 could be configured to modify the depth array with the pixel cutoff distance set to a low value when the runway is encountered during the generation of the synthetic image data set. When synthetic pixel data representative of a point on the runway is being generated by the SVS 110, the value of the actual depth D to the point contained in the depth array could be replaced by the low pixel cutoff distance (e.g., 0 feet or 1 foot). When the IG 140 identifies each location within the depth array having the low value, only each point of the surface feature will be identified, resulting with the image shown in FIG. 4F.

It should be noted that, although the preceding discussion has been drawn to a configuration of the SVS in which the contents of the depth array may be changed in order to make a determination of whether SVS image data or EVS image data will be used for each pixel, it is possible to determine the usage of either SVS image data or EVS image data based upon inputs received from the input factors 130. A manufacturer and/or end-user could configure the IG 140 to use EVS image data based upon the location of symbology presented on the screen of a display unit. For example, if provided with the screen (i.e., pixel) locations of the symbologies of other aircraft traffic, the IG 140 could ensure the employment of EVS image data at or surrounding the symbologies regardless of and/or independent of the pixel cutoff distance as applied to the specific screen locations. In another example, if the screen location of the symbology of the flight path vector was provided to the IG 140, the IG 140 may employ EVS image data at or surrounding the symbology.

It should be further noted that, although the preceding discussion has been drawn to the use of either SVS image data or EVS image data at each pixel, it is possible to use a blend of each in the combined image data through the use of one or more blending algorithms known to those skilled in the art. For example, EVS image data that is relatively "far away" from EVS image data (as measured by pixels) could be weighted in favor of the EVS image data, whereas EVS image data that is relatively "close" to EVS image data could be weighted in favor of the SVS image data.

Figure 5:
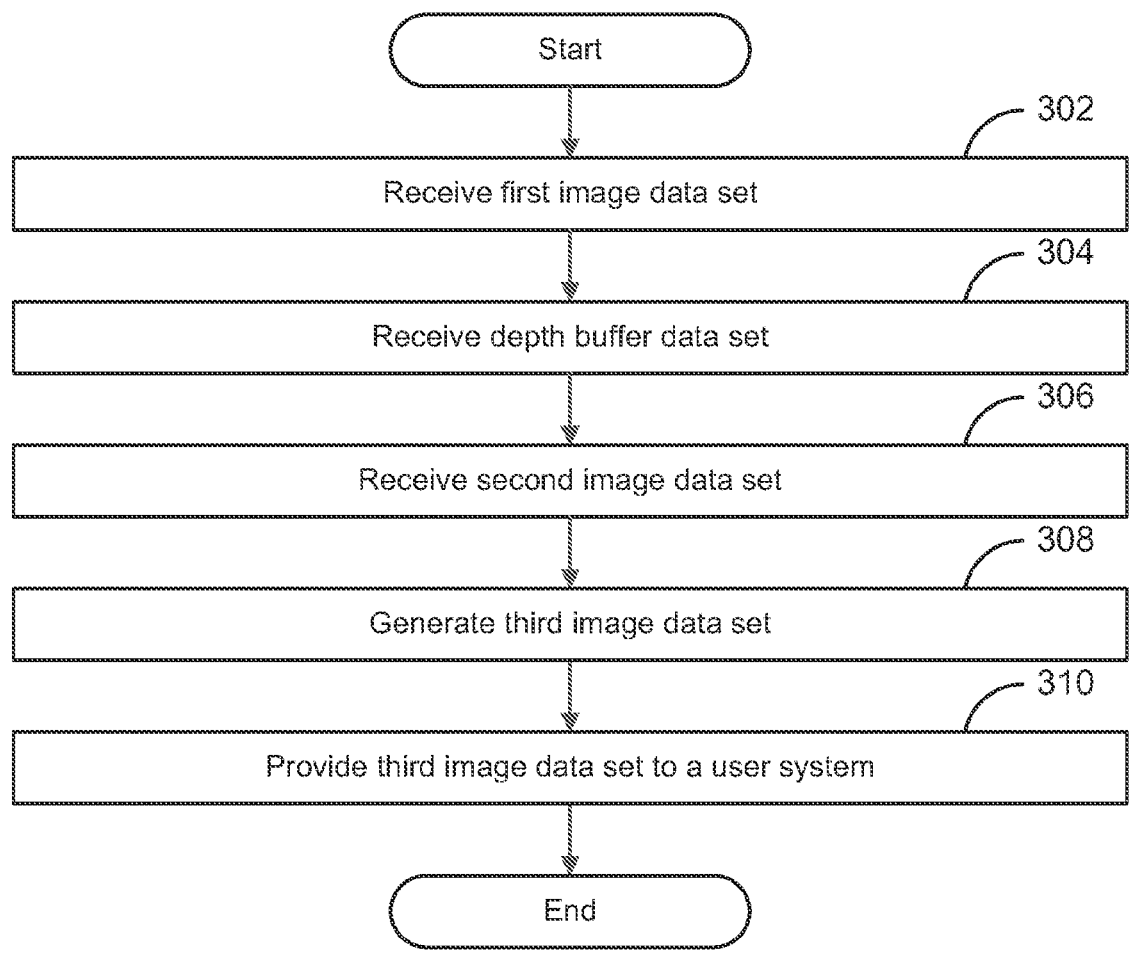
FIG. 5 depicts a flow chart of a method for combining image data generated by a plurality of vision sources.

FIG. 5 depicts flowchart 300 disclosing an example of a method for combining image data generated by a plurality of vision sources of an aircraft, where the IG 140 may be programmed or configured with instructions corresponding to the following modules embodied in flowchart 300. As embodied herein, the IG 140 may be a processor or a combination of processors found in the SVS 110, the EVS 120, the input variable system(s) 130, and/or the presentation system 150. Also, the IG 140 may be a processor of a module such as, but not limited to, a printed circuit card having one or more input interfaces to facilitate the two-way data communications of the IG 140, i.e., the receiving and providing of data. As necessary for the accomplishment of the following modules embodied in flowchart 300, the receiving of data is synonymous and/or interchangeable with the retrieving of data, and the providing of data is synonymous and/or interchangeable with the making available or supplying of data.

Flowchart 300 begins with module 302 with the receiving of a first image data set representative of a scene outside the aircraft. As embodied herein, the first image data set could be comprised of a synthetic pixel data generated and/or provided by the SVS 110.

The flowchart continues with module 304 with the receiving of a depth buffer data set representative of a plurality of depth distances. As embodied herein, the SVS 110 may be configured to determine one or more depth distances as a function of a pixel cutoff distance and a surface feature such as, but not limited to, a runway.

The flowchart continues with module 306 with the receiving of a second image data set representative of a second scene outside the aircraft. As embodied herein, the second image data set could be comprised of an enhanced pixel data generated and/or provided by the EVS 110.

The flowchart continues with module 308 with the generating of a third image data set representative of a third scene outside the aircraft as a function of the first image data set, the second image data set, the depth buffer data set, and data representative of the pixel cutoff distance. The generating (or forming) of the third image data set could be accomplished by identifying each location within the depth buffer data set at which the depth distance is less than or equal to the pixel cutoff distance. Then, first pixel data may be replaced with second pixel data at each location corresponding to each identified location within the depth buffer. Alternatively, the generating of the third image data set could be accomplished by identifying each location within the depth buffer data set at which the depth distance is greater than or equal to the pixel cutoff distance. Then, second pixel data may be replaced with first pixel data at each location corresponding to each identified location within the depth buffer.

In an additional embodiment, the function could include data representative of a FOV of the first image data set and/or data representative of a FOV of the second image data set. If the FOV of the second image data set is less than the FOV of the first image data set, then first pixel data outside of the FOV of the second image data may not be replaced at each location corresponding to each identified location if the identified location falls outside of the second FOV.

The flowchart continues with module 310 with the providing of the third image data set to one or more user systems. As embodied herein, one user system could be comprised of the presentation system 150, where such system could be configured to receive the third image data set and present the image represented in the third image data set on one or more display units. Then, flowchart 300 proceeds to the end.

It should be noted that the method steps described above may be embodied in computer-readable medium as computer instruction code. It shall be appreciated to those skilled in the art that not all method steps described must be performed, nor must they be performed in the order stated.

As used herein, the term "embodiment" means an embodiment that serves to illustrate by way of example but not limitation.

It will be appreciated to those skilled in the art that the preceding examples and embodiments are exemplary and not limiting to the scope of the present invention. It is intended that all modifications, permutations, enhancements, equivalents, and improvements thereto that are apparent to those skilled in the art upon a reading of the specification and a study of the drawings are included within the true spirit and scope of the present invention. It is therefore intended that the following appended claims include all such modifications, permutations, enhancements, equivalents, and improvements falling within the true spirit and scope of the present invention.

What is claimed is:

1. A system for combining image data generated by a plurality of vision sources of an aircraft, such system comprising:
   a first vision source configured to generate
      a first image data set representative of a first scene outside an aircraft, and
      a depth buffer data set representative of a plurality of depth distances;
   a second vision source is configured to generate a second image data set representative of a second scene outside the aircraft; and
   an image generator configured to:
      receive the first image data set,
      receive the depth buffer data set,
      receive the second image data set,
      generating a third image data set as a function of the first image data set,
         the second image data set,
         the depth buffer data set, and
         data representative of a pixel cutoff distance, where the third image data set is representative of a third scene outside the aircraft, and
      provide the third image data set to at least one user system, and
   wherein the third image data set is generated by the image generator configured to identify each location within the depth buffer data set at which the depth distance is less than or equal to the pixel cutoff distance, and
      replace pixel data of the first image data set with pixel data of the second image data set at each location corresponding to each identified location within the depth buffer data set.

2. The system of claim 1, wherein
   the first vision source is comprised of a synthetic vision system, and
   the second vision source is comprised of an enhanced vision system.

3. The system of claim 1, wherein the first vision data source is further configured to determine at least one depth distance of the depth buffer data set as a function of the pixel cutoff distance and a surface feature.

4. The system of claim 1, wherein
   the function for generating the third image data set includes
      data representative of a field of vision of the first image data set, and
      data representative of a field of vision of the second image data set.

5. The system of claim 1, wherein at least one user system is a presentation system configured to receive the third image data, such that
   the image represented in the third image data set is presented on at least one display unit of the presentation system.

6. The system of claim 1, further comprising:
   at least one source of at least one input variable data, where the image generator is further configured to
      receive each input variable data, and
      determine the pixel cutoff distance as a function of each input variable represented in the input variable data.

7. The system of claim 6, wherein
   at least one source of at least one input variable data is comprised of
      a user interface,
      a flight information data source,
      a datalink, or
      any combination of these.

8. The system of claim 1, further comprising:
   at least one source of at least one input variable data, such that
      the function for generating the third image data includes data representative of each input variable.

9. The system of claim 8, wherein one source is comprised of a source of symbology data.

10. A device for combining image data generated by a plurality of vision sources of an aircraft, such device comprising:
an image generator configured to
receive a first image data set representative of a scene outside an aircraft,
receive a depth buffer data set representative of a plurality of depth distances,
receive a second image data set representative of the scene outside the aircraft,
generate a third image data set as a function of
the first image data set,
the second image data set,
the depth buffer data set, and
data representative of a pixel cutoff distance, where
the third image data set is representative of the scene outside the aircraft, and
provide the third image data set to at least one user system, and
wherein the third image data set is generated by the image generator configured to identify each location within the depth buffer data set at which the depth distance is less than or equal to the pixel cutoff distance, and
replace pixel data of the first image data set with pixel data of the second image data set at each location corresponding to each identified location within the depth buffer data set.

11. The device of claim 10, wherein at least one depth distance of the depth buffer data set has been determined as a function of the pixel cutoff distance and a surface feature.

12. The device of claim 10, wherein
the function for generating the third image data set includes
data representative of a field of vision of the first image data set, and
data representative of a field of vision of the second image data set.

13. The device of claim 10, wherein
at least one user system is a presentation system configured to receive the third image data, such that
the image represented in the third image data set is presented on at least one display unit of the presentation system.

14. The device of claim 10, wherein
the image generator is further configured to
receive at least one input variable data, and
determine the pixel cutoff distance as a function of each input variable represented in the input variable data.

15. The device of claim 10, wherein
the image generator is further configured to
receive at least one input variable data, such that
the function for generating the third image data includes data representative of each input variable.

16. A method for combining image data generated by a plurality of vision sources of an aircraft, such method comprising:
receiving a first image data set representative of a scene outside an aircraft,
receiving a depth buffer data set representative of a plurality of depth distances,
receiving a second image data set representative of the scene outside the aircraft,
generating a third image data set as a function of
the first image data set,
the second image data set,
the depth buffer data set, and
data representative of a pixel cutoff distance, where
the third image data set is representative of the scene outside the aircraft, and
providing the third image data set to at least one user system, and
wherein the generating of the third image data set is comprised of
identifying each location within the depth buffer data set at which the depth distance is less than or equal to the pixel cutoff distance, and
replacing pixel data of the first image data set with pixel data of the second image data set at each location corresponding to each identified location within the depth buffer data set.

17. The method of claim 16, wherein at least one depth distance of the depth buffer data set has been determined as a function of the pixel cutoff distance and a surface feature.

18. The method of claim 16, wherein
the function for generating the third image data set includes
data representative of a field of vision of the first image data set, and
data representative of a field of vision of the second image data set.

19. The method of claim 16, wherein
at least one user system is a presentation system configured to receive the third image data, such that
the image represented in the third image data set is presented on at least one display unit of the presentation system.

20. The method of claim 16, further comprising:
receiving at least one input variable data, and
determining the pixel cutoff distance as a function of each input variable represented in the input variable data.

21. The method of claim 16, further comprising:
receiving at least one input variable data, such that
the function for generating the third image data includes data representative of each input variable.

* * * * *